March 31, 1964  J. A. HARDMAN  3,126,990
CLUTCH AND BRAKE SYSTEM FOR TRACK LAYING VEHICLE TRANSMISSIONS
Filed March 12, 1962  2 Sheets-Sheet 1

INVENTOR.
JAMES A. HARDMAN
BY M. Ralph Shaffer
HIS ATTORNEY

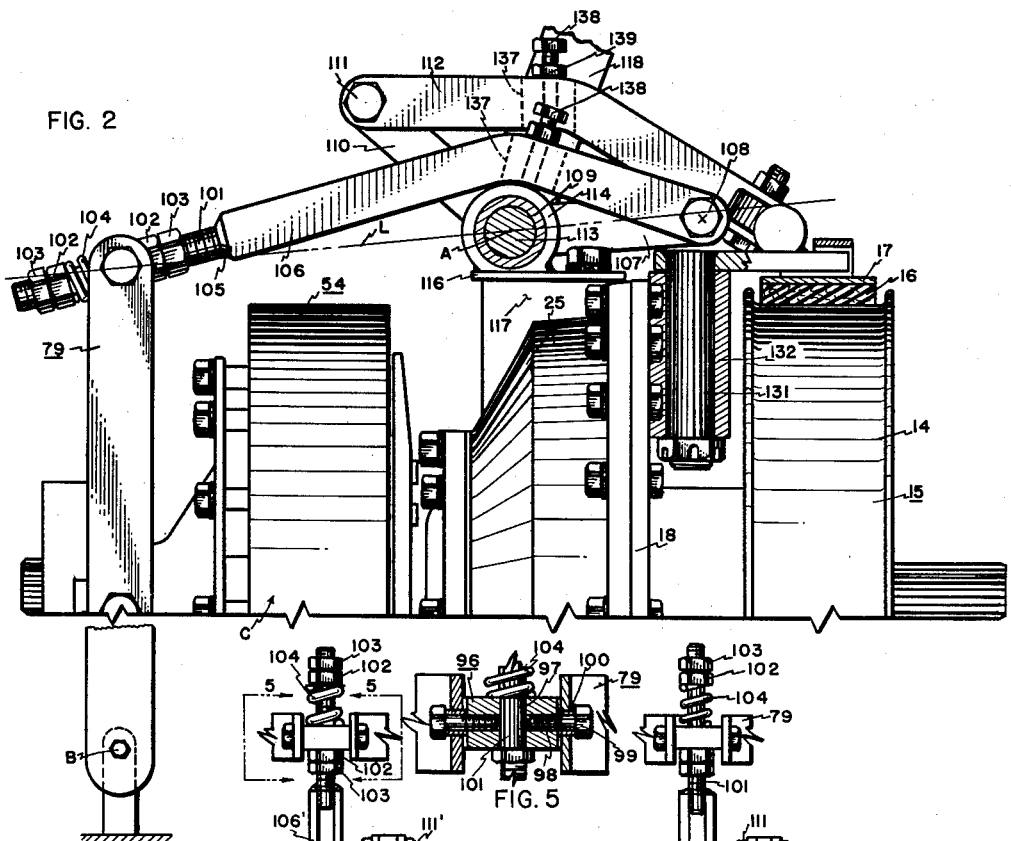

United States Patent Office 3,126,990
Patented Mar. 31, 1964

3,126,990
CLUTCH AND BRAKE SYSTEM FOR TRACK
LAYING VEHICLE TRANSMISSIONS
James A. Hardman, Logan, Utah, assignor to Utah
Scientific Research Foundation, a corporation of Utah
Filed Mar. 12, 1962, Ser. No. 179,127
3 Claims. (Cl. 192—4)

The present invention relates to transmissions for track-laying vehicles wherein a single input drive is coupled to and supplies power for plural output drives and, more particularly, to a single input, tandem output, doubles clutch and brake system wherein the respective halves of the transmission may be lever controlled to be either in neutral, braked, or clutch-engaged condition as desired, depending upon the type of travel to be used.

A principal object of the present invention is to provide a single input drive, tandem output transmission for a track-laying vehicle, with the transmission including at each respective half thereof selectively actuatable clutch means and brake means, wherein by a single, respective double-acting lever control system the power output shaft may be either braked, left in neutral position, or engaged by clutch actuation with the input drive, as desired.

A further object of the present invention is to provide direct and inexpensively manufactured means for simultaneously conditioning the clutch and brake mechanisms associated with an output drive of a transmission in a desirable manner for the type of travel to be taken by the vehicle incorporating the same.

A further object of the invention is to provide an improved, single input, tandem output transmission which may be actuated by a pair of levers acting in a convenient positive manner for driving a vehicle in a desired manner.

A further object of the invention is to provide a single input, tandem output transmission for track-laying vehicles wherein the respective output drive portions thereof are respectively controllable by individual levers such that, with respect thereto, an individual lever will control neutral, clutch-engaged and braked conditions in a manner that the clutch and brake means are interlinked to function alternately only and not at the same time.

Another object is to provide a simple, compact, and easily maintained, tandem-output transmission which is sufficiently light to use in an over-snow vehicle, for example.

Another object is to provide a transmission design wherein the speed reduction therein can be as much as 5-1, or even more.

Another object is to provide brake means at a point in the output power lane wherein the rotative speed is high and the drive torque low so that the brake design can be light and disposed remotely from moisture sources.

Another object is to take advantage in the present invention of spur-type gearing so as to avoid the servicing complications incurred in the use of bevel, hypoid and worm type gears.

Another object is to provide for a self-contained unit which is easily installed and removed from the vehicle for repair, and which can be repaired in the field without special tooling.

Another object is to facilitate a transmission design wherein the same can be installed substantially forward of the rear wheels so as to advance the center of gravity of the vehicle forwardly; in snow vehicles rearward weight is objectionable.

Another object is to provide for two handles which can easily and completely control a vehicle.

Another object is to take advantage of the principle of infinite leverage (over-center toggle) to make the operation easily controlled.

Another object is to provide for a side-control which can be extended forwardly or rearwardly to accommodate driver access by simple means.

Another object is to anchor all pivots and fastenings associated with the transmission to the central housing thereof.

Other objects may be perceived from the drawings in which:

FIGURE 2 is a side elevation along the line 2—2 in FIGURE 1, illustrating the upper half (above center line) of a representative half of the clutch and brake system as coupled to the input drive and, additionally, illustrates control means for simultaneously conditioning the clutch and brake of each representative half of the system as desired.

FIGURE 3 is a plan view of a portion of the structure shown in FIGURE 2, rotated 90° in a clockwise direction for convenience of illustration.

FIGURE 4 is an enlarged fragmentary elevation taken along the line 4—4 in FIGURE 3.

FIGURE 5 is an enlarged detail, principally in section, of a portion of the structure in FIGURE 3 and is taken along the box configured line 5—5.

Figure 1:
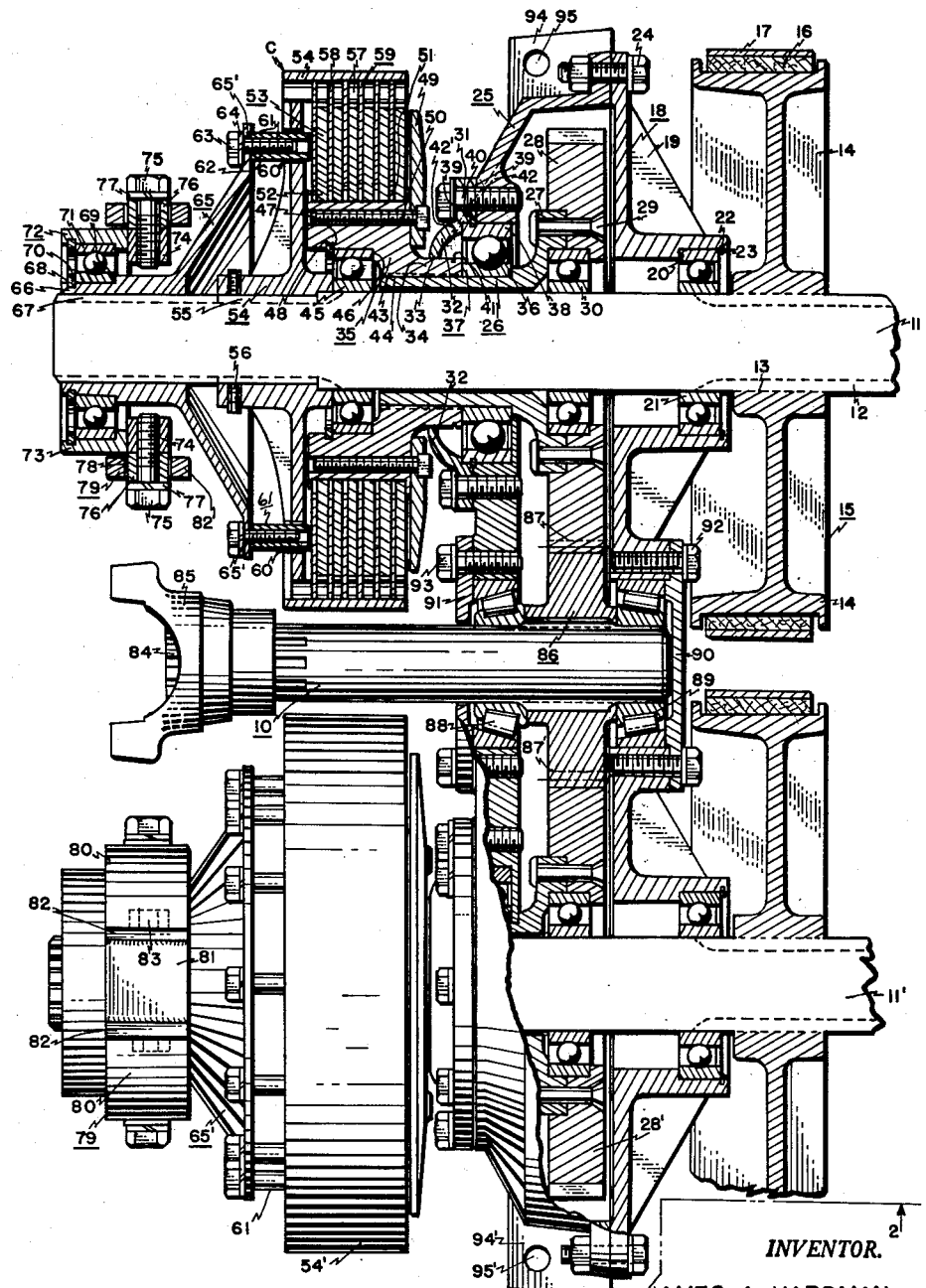
FIGURE 1 is a plan view, partially broken away and in section for purposes of clarity, of a clutch and brake system for track control according to the present invention.

In FIGURE 1 are illustrated input shaft 10 and a pair of output shafts 11 and 11'. As will be seen hereinafter, the mechanisms intercoupling the input shaft 10 with output shafts 11 and 11' are rotated at a uniform angular velocity, in accordance with but generally geared down from the angular velocity of input shaft 10, or alternatively, either one of the output shafts 11 and 11' is braked while the remaining one is clutched, is braked while the remaining one is driven, or both are braked to stop the vehicle.

As the structure is entirely symmetrical about input shaft 10, only the upper half of the structure (above input shaft 10 in the drawing) will be discussed, and the corresponding parts at the lower half of the structure will be given suitable prime marks.

Beginning at a representative output side for convenience, it is seen that output shaft 11 is splined at 12 for receiving the spline fitting 13 of brake drum 14. The brake 15, of which brake drum 14 is a component part, will of course include the conventional brake lining 16 and circumferential brake band 17. A housing plate 18 is provided with suitable reinforcing ribs 19 and has an internal shoulder 20 for seating carrier bearing 21. Carrier bearing 21 enables the output shaft to revolve freely within the housing plate 18 so that the latter may remain fixed in this position. The carrier bearing 21 is positioned by a suitable interior recess 22 and the placing therewithin of snap ring 23. Affixed by means of capscrew attachments 24 to the housing plate 18 is the principal or main housing 25. It should be noticed at this juncture that the housing plate 18 and main housing 25 extend completely through the entire structure so as to provide journals for input shaft 10 and output shafts 11 and 11'. A sleeve 26 is freely rotatable about output shaft 11 and is provided with a flange 27 which is rigidly affixed to driven gear 28 by rivets or other suitable attachments 29. The sleeve, driven gear combination (26, 28) are journalled by a carrier bearing 30, the latter being pressed onto output shaft 11. Journalling at the remaining end of the sleeve construction will be described hereinafter.

Affixed to the main housing 25 by means of capscrew attachments 31 is an oil baffle plate 32 which has a small clearance of the order of a few thousandths of an inch at 33 for admitting the sleeve extension 34 of spider 35.

Sleeve 26 is provided with a shoulder at 36 for seating bearing 37. The outer race of the bearing at 38 is positioned by a snap ring 39 which is seated in a recess 40 of the oil baffle plate 32. Preferably, there will be provided an oil "slinger groove" 41; and suitable return passageways 42 and 42' (shown revolved 90° for convenience of illustration) will be supplied at the bottom of oil baffle plate 32 and main housing 25 so that the oil lubricant as is used in main housing 25 will be returned by these passageways if losses chance to occur to the left of bearing 37.

Clutch spider 35 is interiorly splined at 43 for receiving the exterior splines at 44 of sleeve 26. The clutch spider 35 is carried by a bearing 45 which is shouldered in the spider at 46 and held in place by snap ring 47 as disposed in spider recess 48. Thus it will be noted that the combination of clutch spider 35 and sleeve 26 is in fact carried by the carrier bearings 30 and 45.

As noted in the upper half of FIGURE 1 the clutch spider 35 is provided with a clutch backing or reaction plate 49 which is secured in place by capscrews 50 (one being shown). The clutch spider will include a plurality of longitudinal, circumferential slots 51 which provide keyways for the ears 52 of the preferably, rather thick clutch discs 53, the latter preferably made of suitable fibrous material, for example. Thus, all of the clutch discs 53 are keyed to the spider 35 and are free to move in a longitudinal direction under the pressure of compression fingers of the clutch which shall be hereinafter described. Clutch drum 54 is splined onto output shaft 11 at 55 and is secured in position by suitable set screw means 56. The clutch drum is preferably interiorly slotted longitudinally at several places (see slot 57) for receiving the ears 58 of movable, preferably thin clutch discs 59. These clutch discs are conventional and will most probably be fabricated of steel.

It will be noted that the clutch drum 54 of clutch C is provided with a plurality of mutually spaced apertures 60 which are also and likewise radially spaced from the center. These apertures are for the purpose of receiving compression fingers 61, each of which takes the form of sleeve 62 and capscrew 63, plus optionally included washers 64, a plurality of which are respectively secured in spaced radial and circumferential relationship along and mounted through suitable apertures 65" of the clutch pressure plate 65. The clutch pressure plate is preferably of frustro-conical configuration. The pressure plate boss 66 is splined at 67 to output shaft 11 and is freely translatable therealong. It will be noted that since the pressure plate 65 and the clutch drum 54 are both splined onto output shaft 11 by the same spline pattern, compression fingers 61 will always be in registration with apertures 60.

The pressure plate boss 66 is provided with a groove 68 and also with a shoulder 69 for respectively receiving snap ring 70 and bearing 71, the latter being positioned by these two. Disposed about and providing a seat for bearing 71 is a control collar 72 which comprises a ring 73 and a pair of lugs 74 welded thereto. The lugs receive capscrews 75 which are threaded therein and which mount respective sleeve bearings 76 and optionally include washers 77. As shown in FIGURE 1 the sleeve bearing 76 receives the apertured ears 78 and yoke 79, shown with particularity also at the lower left portion of FIGURE 1. Yoke 79 is anchored at B to structure fixedly disposed with respect to housing 25, and may be made up of one of several forms; for example, it may include suitably configured side straps 80 and spacer bridge 81, together with upstanding attachment ears 82 for mounting to an external linkage (not here shown). Capscrews 83 may be used to secure in pivotal relationship the external linkage to the yoke 79.

Thus far described is a representative one of two identical halves of the structure; i.e. on both sides of input shaft 10. The input shaft 10 itself is splined at 84 to receive the splined connection of a universal coupling yoke 85 which itself is adapted for connection to the prime mover or power source (not shown). Drive gear 86 is splined, keyed or otherwise secured to the input shaft 10 and engages driven gear 28 at area 87. Engagement to the remaining driven gear 28' is made in area 87'. As for journalling, the input shaft 10 is provided with suitable bearings 88 and 89 the interior and exterior races of which are respectively shouldered against drive gear 86 and input shaft 10 and which are retained in place by bearing caps 90 and 91, the latter being secured in place by capscrews 92 and 93, respectively, to the main housing 25.

The operation of the system as thus far described is as follows. A prime mover such as the output shaft of an internal combustion engine (not shown) is coupled to the universal coupling yoke 85 to drive input shaft 10. It will be noted that drive gear 86 is of a smaller diameter than the driven gears 28 and 28'. Thus, a speed reduction which may, for example, be of the order of 5 or 6-to-1 is inherent in the system so that the driven output shafts 11 and 11' will revolve at a lower rate than the input shaft 10. In this feature alone is a great advantage since in this area of the transmission there already occurs a marked speed reduction for ultimate transmission to the sprockets or wheels of the vehicle incorporating the same.

Revolvement of the driven gear 28 is accompanied by a corresponding revolvement of sleeve 26 and spider 35 splined thereto so that the inwardly disposed clutch discs 53, in being keyed to slots 51, are also caused to revolve. Thus far, the output shaft 11 does not rotate. When, however, inward thrust is applied to the pressure plate 65 by virtue of the inward movement of yoke 79, the clutch compression fingers 61 will "make" the clutch, i.e. compress together the revolving clutch discs 53 and the stationary clutch discs 59 (keyed to clutch drum 54) so that the clutch pack will be compressed together against reaction plate 49, thereby engaging the output shaft 11 with positively driven gear 28. Thus, the two pluralities of clutch discs are urged by the compression fingers 61 toward and against the clutch backing or reaction plate 49. Again, this effects clutch engagement so that now the output shaft 11 is driven through the clutch C by the driven gear 28.

It will be noted at this juncture that the brake drum 14 is splined to shaft 11. Hence, upon the tightening of brake band 17 the brake will become operative so as to reduce the speed of output shaft 11. It will be shown hereinafter that the linkage and lever mechanism shown in FIGURE 2 will control one-half of the structure of FIGURE 1 (i.e. above the designation of input shaft 10) whereas the remaining linkage and lever mechanism will control the bottom half (see FIGURE 1) of the structure. For each lever mechanism there will be a clutch position, a brake position, and a neutral position. Thus, at neutral position the output shaft 11 will not be coupled to the input shaft 10. In the brake position the clutch will be disengaged but the brake will be applied by the tightening of brake band 17. In the "clutched" or "clutch engaged" position, the clutch pack will be "made up" so that there will be a direct coupling through the clutch C of output shaft 11 to driven gear 28. Further, it will be noted that when the clutch is in engaged condition the brake will not be applied and this automatically by virtue of the simultaneous opposite motions of the clutch and brake mechanisms of the system; conversely, when the brake is applied or made operative, then the clutch will be in disengaged condition.

Finally, before leaving a consideration of FIGURE 1, it will be noted that there may be provided mounting bosses such as 94 for the main housing 25 whereby the structure may be mounted to a vehicle as by apertures 95.

Reference is now made to FIGURES 2, 3 and 5. It will be noted that interiorly disposed with respect with yoke member 79 (see FIGURE 5) is a junction member 96 which is provided with a central bore 97 and tapped holes 98 receiving cap screws 99. Sleeve bearing 100 are supplied and journal the yoke member 79 to junction member 96. Terminal 101 comprises stub shaft which is threaded and provided with adjustment and lock nuts 102 and 103 (see FIGURE 2) and with compression spring 104. The operation of spring 104 and nuts 102 and 103 in connection with devices of this general character have been previously disclosed in the inventor's pending application, Serial No. 784,240, now Patent Number 3,044,318, filed December 31, 1958, and entitled, "Drive Mechanism for Track Laying Vehicle," and forms no part of the present invention per se. The terminal member or stub shaft 101 is welded at 105 to clutch control link member 106, forming an integral part thereof, and the latter is pivotally secured to clutch control arm 107 by pivot attachments 108.

As shown in FIGURE 3 the clutch control arm 107 is welded or otherwise secured to sleeve 109. Likewise, brake control arm 110 is also secured to sleeve 109 as by welding and is pivotally connected by pivot attachments 111 to brake control link member 112. Shaft 113 is disposed through sleeve 109 and the two are concentrically journalled in pillow block bearing 114. Another pillow block bearing 115 journals the remaining end of shaft 113. These pillow block bearings are disposed upon boss plate 116 (see FIGURE 1) which is integrally associated with the boss 117 of the housing 25.

The clutch control link member 106', clutch control arm 107', brake control link member 112' and brake control arm 110' of the remaining half of the structure are identical with that previously described and hence will be given prime ("'") designations but will not be discussed further at this point. They are, however, as will be noted, welded or otherwise integrally secured to the shaft 113 directly.

Lever 118 is affixed by a clamp, by welding or other means to the sleeve 109 to accomplish the rotation of same and hence the rotational displacement of clutch control arm 107 and the brake control arm 110. It will be noted that the displacement, rotationwise, of the lever 118 in accomplishing the rotational displacement of clutch control arm 107 and brake control arm 110 (let us assume in a counter-clockwise direction looking from right to left) will urge the yoke member 79 in FIGURE 2 to the right so as to make or engage the clutch C while at the same time releasing pressure on the brake band 17 so as to insure that the brake 15 is disengaged. Correspondingly, when a rotation of lever 118 is in the opposite (clockwise) direction, then clutch C will become disengaged by virtue of the outward or leftward motion of yoke member 79 and, correspondingly, the brake will become actuated by virtue of the tightening of brake band 17. Preferably the device will be designed so that there will be a neutral position for the lever 118 so that neither the brake nor the clutch are engaged.

The mechanism for actuating the brake will now be discussed. Reference is made to FIGURE 4 wherein is seen in partial fragmentary view the brake band 17 and also the brake lining 16. Brake band 17 is disposed peripherally about the brake lining 16 and drum 14, with one end of the brake band 17 being adjustably secured by a T-bolt 119 and adjustment and lock nuts 120 and 121 to a bracket 122 which is rigidly secured by attachments 123 to the housing plate 18 or other stationary structure. The brake lining will be riveted to the brake band in the usual manner. As to the present invention there is preferably supplied a strap 124 which is riveted by rivets 125 to the brake band 17. A thrust seat member 127 is also included and is welded or otherwise fixedly secured to strap 124 and to brake band 17 and is also shown in FIGURE 3 as having concave seat 128, the strap 124 being broken away for clarity. Brake band actuating arm 129 fixedly connects to brake actuating terminal connector 126 and includes a convex portion 130 which nests in seat 128. The brake band actuating arm 129 is welded or otherwise secured to a stub shaft 131 which is journalled within journal 132, the latter being affixed by bolts 133 (see FIGURE 3) or other suitable means to the housing plate 18 or other suitable stationary structure. The brake mechanism is identical for the remaining half of the structure, and will be designated in prime marks such as 126' but will not be further described. In FIGURE 3 it will be noted that there is conveniently provided a journalling lug 134' (identical with the lug, not shown, 134 associated with the other structure). The journalling lug 134' includes perpendicular bores 135' and 136', the latter for receiving pin 137' for universally coupling the brake actuating terminal connector 126' to its brake control link member 112'. The remaining aperture 135' of course is for the reception of the brake actuating terminal connector 126' and for the securement thereto by nut 136'.

With reference to FIGURES 3 and 4 the operation of the structure thereof now becomes clear. With reference to the right-hand portion of the structure it will be seen that the rotation of sleeve 109 by the rotational displacement of lever 118 in, let us assume, a clockwise direction looking from right to left, will be accompanied by an outward motion of clutch control link member 106 and hence by an outward movement by yoke member 79 and a disengagement of the clutch C. Assuming this motion is far enough to traverse past the neutral position, then the rotation will simultaneously produce a pulling upon the brake actuating terminal connector 126 (which is welded to the brake band actuating arm 129) so as to cause the latter to thrustingly urge to the right the thrust seat member 127. Since the latter is welded or otherwise securely affixed to the brake band 17, this thrusting action will be accompanied by a tightening of the brake band and hence by a setting of the brake.

In a corresponding manner the rotation of lever 118 in a counter-clockwise direction looking from right to left will be accompanied (assuming the rotation is far enough) by a complete loosening of the brake band and engagement of the clutch as hereinbefore described.

The same action, which is identical in nature, may be found with reference to the actuation of lever 118' in connection with the clutch control link member 106', the brake control link member 112' and the remaining structure. Thus, the two levers 118 and 118' control their respective halves of the structure so that, for example, the left wheel or drive sprocket of a vehicle incorporating the system will be controlled by one lever whereas the remaining or right drive sprocket associated with the opposite track of the vehicle will be controlled by the other lever. Hence, there is provided a two-lever system by which the vehicle will assume a regular straight course. The vehicle may also be braked by the appropriate repositioning of levers 118 and 118' so that both sprockets are braked. The vehicle may also assume a neutral position for starting or for other reasons by the central disposition of both the levers 118 and 118' so that neither of the clutches is engaged and, further, neither of the brakes is engaged. And, for turning purposes, one sprocket may be braked while the other is driven by the drive shaft 10 so that the turning may be accomplished in any desired direction, the direction chosen being determined by the relative positioning of the two levers 118 and 118'.

It will be noted in connection with FIGURE 2 that the clutch control link member 106, brake control link member 112 (and their counterparts 106' and 112' of the remaining half of the system) are curved about shaft 113 and sleeve 109 so that the pivot point at 108 (or 111) will be disposed such that the force vector thereof, when coincident with the line L—and the clutch engagement point is determined in accordance therewith—, will be proximate axis A of the shaft 113 and sleeve 109 so that, by over-toggling slightly with respect to axis A to achieve a locked position, as shown, with respect to members 106 and 107, for example, almost an infinite force can be applied, with a minimum of manual effort, to yoke 79 as lever 118 is rotated in a clockwise direction. The same is true for brake engagement upon the counterclockwise rotation of lever 118 in connection with brake control arm 110 and brake control link member 112, also with the brake members 110′, 112′ and clutch members 106′, 107′ and rotation of lever 118′ of this remaining half of the system.

Spacer bridges 137, 137′ are welded or otherwise secured interiorly of members 106, 112 and 106′, 112′, respectively, for providing for travel limiting screws 138 which are threaded therein and protrude therebeyond, the said travel limiting screws being locked in place by locknuts 139. The tips of travel limiting screws 138 engage either the sleeve 109, or the shaft 113, as the case may be, to limit the over-toggle for the locking effect desired, as determined by the turning of said limiting screws 138.

Accordingly, it is seen that what is provided is a novel and highly effective means, easily constructed and maintained of driving an endless vehicle track wherein the drive sprockets are respectively and operatively coupled to the output shafts 11 and 11′, respectively, of FIGURE 1, and with the system being provided with two lever controls whereby any one of several driving conditions may be achieved, and this in a very convenient manner and by simple and easily manufactured means.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A transmission including, in combination, a housing, an input shaft journaled within said housing and extending outwardly therefrom for coupling to a power source, a pair of output shafts journaled within and extending through and protruding beyond said housing on opposite sides thereof, drive gear means fixedly keyed to said input shaft and disposed within said housing, a pair of driven gear means each disposed in mesh with said drive gear means and also within said housing and revolvably journaled upon said output shafts, respectively, a pair of sleeve means respectively journaling said output shafts, said sleeve means being respectively integral with said pair of driven gear means, being journaled within said housing, and extending outwardly therefrom on at least one side thereof and terminating short of the respective extremities of their respective output shafts, a pair of clutch means respectively secured to and between said output shafts and their respective sleeve means for selectively coupling rotational energy of said sleeve means to their respective output shafts, said clutch means being disposed on said one side of said housing exterior thereto, a pair of brake means respectively secured to said output shafts on the remaining side of said housing exterior thereto, a pair of lever means pivotal about axes which are transverse with respect to their respective output shafts, and first and second linkage means respectively intercoupling said lever means with both the said clutch means and the said brake means of a respective one of said output shafts for respectively engaging said clutch means and simultaneously insuring the disengagement of said brake means, and for engaging said brake means and simultaneously insuring the disengagement of said clutch means, as desired, said first and second linkage means including over-toggling locking means for locking said brake means and said clutch means, as desired, associated with their respective output shafts, beyond infinite leverage points with respect thereto.

2. A transmission including, in combination, a housing, an input shaft journaled within said housing and extending outwardly therefrom for coupling to a power source, a pair of output shafts journaled within and extending through and protruding beyond said housing on opposite sides thereof, drive gear means fixedly keyed to said input shaft and disposed within said housing, a pair of driven gear means each disposed in mesh with said drive gear means and also within said housing and revolvably journaled upon said output shafts, respectively, a pair of sleeve means respectively journaling said output shafts, said sleeve means being respectively integral with said pair of driven gear means, being journaled within said housing, and extending outwardly therefrom on at least one side thereof and terminating short of the respective extremities of their respective output shafts, a pair of clutch means respectively secured to and between said output shafts and their respectively sleeve means for selectively coupling rotational energy of said sleeve means to their respective output shafts, said clutch means being disposed on said one side of said housing exterior thereto, a pair of brake means respectively secured to said output shafts on the remaining side of said housing exterior thereto, a pair of lever means, each of said lever means including an operating lever pivotal about an axis transverse with respect to its associated output shaft, bearing means fixedly disposed with respect to said housing, revolvable means journaled within said bearing means and affixed to said lever, and first and second control arms affixed to and extending radially from said revolvable means, linkage means including first and second link members pivotally secured at first extremities to said first and second control arms, respectively, at positions remote from said axis, and coupled at their remaining extremities to said clutch means and brake means, respectively, each of said clutch and brake means being actuatable upon the production of tension within said link members, and said link members being so constructed and arranged with respect to said axis that the respective control arm, link member combinations can be over-toggled beyond infinite leverage points by the selected, rotational displacement of said lever, and stop means engaging said combinations at desired over-toggle points.

3. A transmission including, in combination, a housing, an input shaft journaled within said housing and extending outwardly therefrom for coupling to a power source, a pair of output shafts journaled within and extending through and protruding beyond said housing on opposite sides thereof, drive gear means fixedly keyed to said input shaft and disposed within said housing, a pair of driven gear means each disposed in mesh with said drive gear means and also within said housing and revolvably journaled upon said output shafts, respectively, a pair of sleeve means respectively journaling said output shafts, said sleeve means being respectively integral with said pair of driven gear means, being journaled within said housing, and extending outwardly therefrom on at least one side thereof and terminating short of the respective extremities of their respective output shafts, a pair of clutch means respectively secured to and between said output shafts and their respective sleeve means for selectively coupling rotational energy of said sleeve means to their respective output shafts, said clutch means being disposed on said one side of said housing exterior thereto, a pair of brake means respectively secured to said output shafts on the remaining side of said housing exterior thereto, a pair of lever means each including an operating lever pivotal about an axis transverse with respect to its associated output shaft, bearing means fixedly disposed with respect to said housing, revolvable means journaled within said bearing means and affixed to said lever, and first and second control arms affixed to and extending radially from said revolvable means, and linkage means including first and second link members pivotally secured at first extremities to said first and second control arms, respectively, at positions remote from said axis, and coupled at their remaining extremities to said clutch means and brake means, respectively, each of said clutch and brake means being actuatable upon the production of tension within said link members, and said link members being so constructed and arranged with respect to said axis that the respective control arm, link member combinations can be over-toggled beyond infinite leverage points by the selected, rotational displacement of said lever, and adjustable stop means engaging said combinations at desired over-toggle points.

References Cited in the file of this patent

UNITED STATES PATENTS

| | | |
|---|---|---|
| 986,347 | Beese | Mar. 7, 1911 |
| 1,563,568 | Hoar | Dec. 1, 1925 |
| 1,855,209 | Turzicky | Apr. 26, 1932 |
| 2,088,110 | Lamb | July 27, 1937 |
| 2,101,774 | Brasfield | Dec. 7, 1937 |
| 2,429,170 | Royle | Oct. 14, 1947 |

FOREIGN PATENTS

| | | |
|---|---|---|
| 765,471 | France | Mar. 26, 1934 |